Sept. 5, 1933. W. J. WACHOWITZ 1,925,353
CAN WASHING DEVICE
Filed July 12, 1929 3 Sheets-Sheet 2
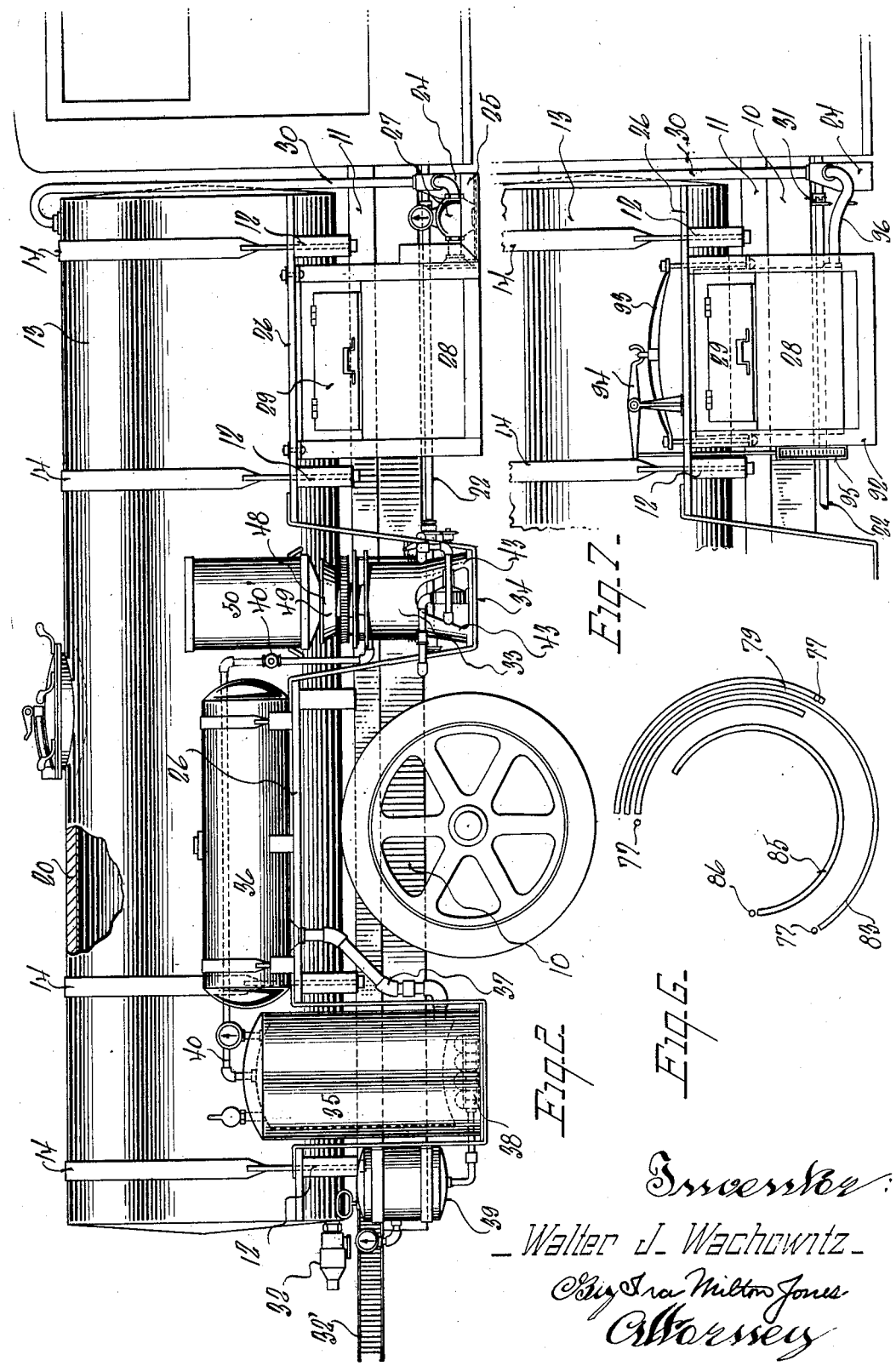

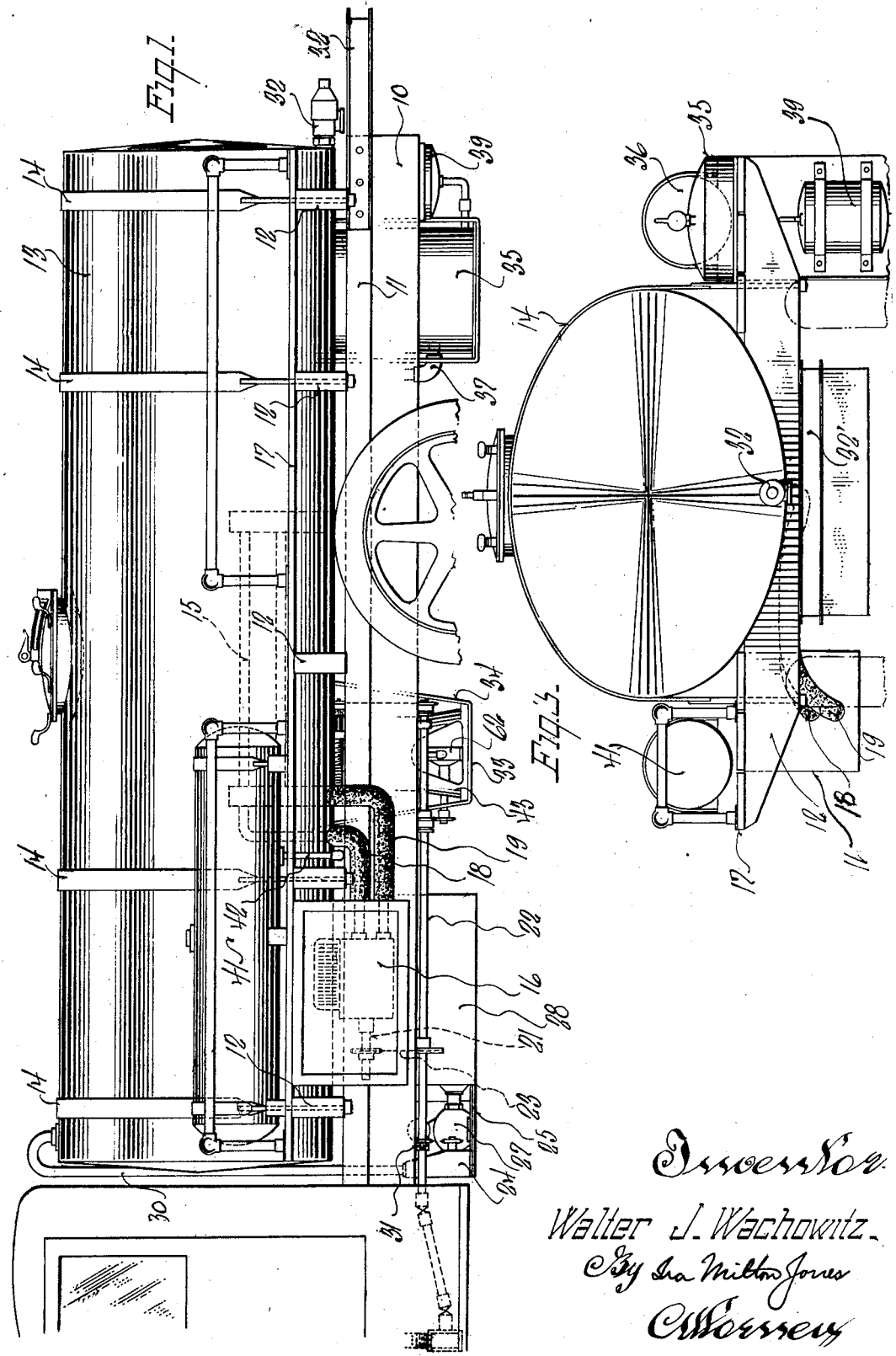

Sept. 5, 1933.  W. J. WACHOWITZ  1,925,353
CAN WASHING DEVICE
Filed July 12, 1929  3 Sheets-Sheet 3
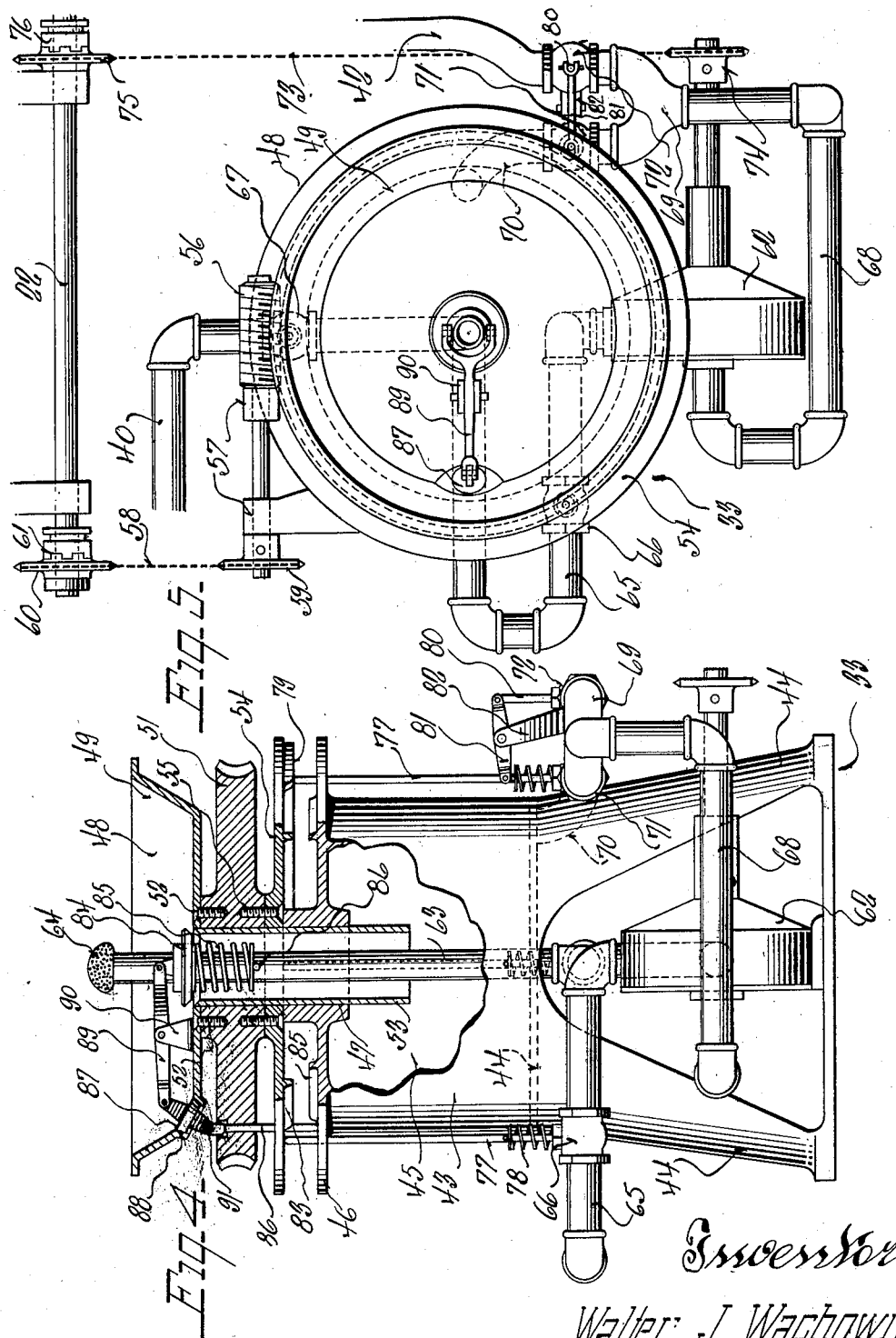
Inventor:
Walter J. Wachowitz
By Ira Milton Jones
Attorney Patented Sept. 5, 1933

1,925,353

UNITED STATES PATENT OFFICE 1,925,353

CAN WASHING DEVICE

Walter J. Wachowitz, Milwaukee, Wis., assignor to Alloy Products Corporation, Milwaukee, Wis., a corporation of Wisconsin Application July 12, 1929. Serial No. 377,899

13 Claims. (Cl. 141—7)

This invention relates to milk collecting and transporting trucks.

Heretofore it has been customary for the farmer to send his milk to the dairies in cans either by truck or rail. This procedure required that the milk be handled several times before it reached its final destination and in warm weather, very often spoiled before reaching the dairy. It is, therefore, an object of this invention to provide a truck or other suitable conveyance having a tank equipped with a refrigerating unit to maintain the milk placed therein at a desired low temperature, so that the truck itself may be driven directly to the farms from which the milk is to be collected, and there weighed, tested and pumped into the tank of the truck.

As the laws of some States require that the dairies cleanse the milk cans, another object of this invention resides in the provision of a truck of the character described having novel means for cleansing milk cans and the like.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated two complete examples of the physical embodiment of my invention constructed according to the best modes I have so far devised for the practical application of the principles thereof, and in which:

Figure 1 is a side elevational view of an automotive truck embodying my invention;

Figure 2 is a view similar to Figure 1 of the opposite side of the truck;

Figure 3 is a rear view thereof;

Figure 4 is a view, partly in elevation and partly in section of the novel can washing device with which the truck is equipped;

Figure 5 is a top plan view of the can washing mechanism illustrating the manner of driving the same;

Figure 6 is a diagrammatic view illustrating the relative positions of the various cams of the can washer; and Figure 7 is a view of a scale device for weighing the milk preparatory to pumping it into the tank, said device being a modification of the metering device illustrated in Figures 1 and 2.

Referring now more particularly to the accompanying drawings, in which like numerals designate like parts throughout the several views, 10 designates the sills of a truck chassis of conventional construction and upon which the longitudinal rails 11 of a tank carrying frame are secured. Cross pieces 12 connect the longitudinal rails 11 and have their medial portions cut away to fit the contour of a tank 13 which is held thereon by straps 14, the ends of which are fixed to the cross pieces 12.

Mounted within the interior of the tank 13 is the cooling element 15 of a refrigerating unit 16 which per se, forms no part of this invention and has not been shown in detail. The unit 16 is supported beneath a platform 17 extending throughout the length of the tank 13 and fixed to the ends of the cross pieces 12 at one side of the tank, and suitably insulated pipes 18 and 19 connect the unit 16 with the cooling element in the usual manner. The tank 13 is also provided with an insulating lining 20.

The refrigerating unit has its drive shaft 21 connected with a power shaft 22 drivingly connected with the power plant of the truck (not shown), by a sprocket chain 23, trained about sprockets on the shafts 21 and 22.

In use, the milk is poured from the farmer's cans into a receiving receptacle 28 having a hinged cover 29, from where it is pumped into the tank 13 by a pump 24, connected with the receptacle and with a flow meter 27 whose outlet is connected with the tank 13 by a flexible hose 30 or the like, the flow meter 27 accurately registering the quantity of milk passing into the tank. The receptacle 28 and the pump 24 are mounted on a frame 25 supported beneath a platform 26 similar to the platform 17, but having portions of its length cut away.

Driving power for the pump 27 is obtained from the power take-off shaft 22, through a conventional chain and sprocket and a suitable sliding clutch 31.

The rear-most end of the tank 13 is provided with a drain valve 32 through which the tank may be completely drained, the valve 32 being protected by a channel iron frame 32' extended from the longitudinal rails 11.

Inasmuch as the laws of some states require that the dairies cleanse the milk cans, the truck is provided with means for automatically accomplishing this result. This means includes a can washing device, indicated generally as at 33, supported by substantially U shaped frame members 34, whose ends rest on the adjacent ends of one of the cut away portions in the platform 26, as clearly illustrated in Figure 2. Mounted at the same side of the truck and at the rear portion thereof, is a steam boiler 35 fed from a water tank 36 mounted upon the adjacent portion of the platform 26 and connected with the boiler through a pipe line 37. Fuel for the burners 38 of the boiler is carried in a pressure tank 39.

The outlet of the boiler, is connected with the can washer 33 by a pipe line 40 having a steam valve 40' therein; and rinsing water for the can washer is carried in a tank 41 mounted on the platform 17 and connected with the washer by a pipe line 42.

The specific construction of the can washer will now be described. The washer comprises a frame 43 preferably of cast construction, having legs 44 and a central dividing wall 44' forming a container 45 in which a suitable cleansing fluid is received. The top of the frame 43 is flanged, as at 46, for a purpose to be later described, and has its central portion provided with a bearing 47 for a revoluble can carrying mechanism, indicated generally as at 48.

The can carrying mechanism 48 comprises a dish shaped member 49 in which the tops of overturned milk cans 50 are received, as illustrated in Figure 2. The dish shaped member 49 is fixed to the top of a worm gear 51 by screws 52 or the like, and whose hub is bored to the same diameter as the bearing 47 to receive a sleeve 53 which is fixed therein and is revoluble in the bearing 47. The worm wear 51 is spaced from the top of the bearing 47 by a cam plate 54 fixed to the under side of the gear by screws 55, the cam plate controlling the operation of the washer, as will be later described. The member 49, the gear 51 and the cam plate 54 are thus rotatably mounted in the bearing 47, and when an inverted can 50 is placed on the member 49 it turns with the carrier.

Rotation is imparted to the can carrying mechanism 48 by a worm 56 rotatably mounted in suitable bearings 57 and drivingly connected with the power take-off shaft 22 through a sprocket chain 58 trained about a sprocket 59 fixed upon the shaft of the worm 56 and about a drive sprocket 60 mounted upon and drivingly connected with the shaft 22 through a conventional clutch 61.

Mounted beneath the container 45 and between the legs 44 of the frame is a pump 62 adapted to force the cleaning solution carried in the container 45 through a discharge pipe 63 positioned axially with respect to the washer mechanism and projected through the sleeve 53 to have its upper end disposed within a can placed upon a dish shaped member 49, the upper end thereof being preferably provided with a suitable nozzle 64 to direct streams of fluid in all directions.

The pipe 63 is connected with the pump through a pipe line 65 in which a valve 66 is interposed to govern the time at which the fluid may pass from the pump into the can, as will be later described; and with the steam line 40 through a valve 67 which is controlled by the rotation of the can carrying mechanism to be opened and closed at predetermined intervals, as will be later described.

The inlet of the pump 62 is communicated with the container 45 through a pipe line 68, a Y fitting 69 and a pipe 70 connecting the interior of the container 45 with the Y fitting through a valve 71 similar to the valves 66 and 67 and likewise controlled by the rotation of the can carrying mechanism and more specifically, the cam plate 54. The Y fitting, and consequently the inlet of the pump, is also connected with the rinsing water supply tank 41 by the pipe line 42 which is opened and closed by a valve 72 interlocked with the valve 71 so that when one valve is open the other is closed.

The drive for the pump 60 is also taken from the power take-off shaft 22 through a sprocket chain 73 trained about a sprocket 74 on the shaft of the pump and about a sprocket 75 mounted upon and drivingly connectable with the shaft 22 through a clutch 76.

The valves 66, 67 and 71 have elongated valve stems 77 which project through guide openings in the flange 46 at the top of the frame 43 to engage the under side of the cam plate 54 and be depressed as their respective cams, to be later described, ride over them; the valves being returned to their normally closed position by springs 78.

In the position illustrated in Figures 4 and 5, the valve 71 has just been opened by a cam 79 (see Figure 6) depressing its stem 77. Simultaneous with the opening of the valve 71, the valve 72 has been closed as its stem 80 is interlocked with the stem of the valve 71 by a link 81 medially pivoted to a supporting arm 82. The cam 79 extends throughout approximately 120 degrees of the total travel of the can carrying mechanism and thus permits the cleansing fluid received in the container 45 to be conducted to the pump 62 throughout approximately one-third the revolution which may be termed the first period of operation.

Immediately after the valve 71 is opened, the valve 66 is opened by a cam 83 riding over its stem 77 to depress the same. The steam valve 67 remains closed and consequently the cleansing fluid is forced into the interior of the can 50 and flows back into the container through the sleeve 53, the entrance to the sleeve 53 being opened and closed by a valve 84, normally urged to open position by a spring 85 confined between the valve and a pin 86 carried by the pipe 63.

The valve 84 remains open throughout the first period of operation during which time the cleansing solution is being pumped into the can, to drain the same back into the container 45, and is closed at the beginning of the second period. A stationary cam 85 projected from the top face of the flange 46 provides means for closing the valve 84 against the action of its spring through a rod 86 slidable in aligned apertures in the cam plate 54 and the worm wheel 51 with its lower end positioned in the path of the cam 85 so that upon rotation thereof with the can carrying mechanism, it rides onto and off of the cam to open and close the valve 84.

Simultaneous with the operation of the valve 84, a valve 87 closes and opens a drain opening 88 in the dish shaped member 49, the valve 87 being closed while the central valve 84 is opened and vice versa. The two valves are connected by a lever 89 centrally pivoted from a boss 90 formed on the bottom of the member 49, and the upper end of the valve actuating stem 86 is connected with the valve 87, as at 91, and thus actuates both valves at the same time.

At the beginning of the second period of operation, the cam 79 passes the stem of the cleansing fluid valve 71 permitting its spring to close the same and simultaneously open the rinsing water valve 72, and as the pump outlet valve 66 remains open fresh water will be sprayed into the can 50 to rinse it, the rinsing water being drained from the member 49 through the drain opening 88 which has been opened by the stem 86 riding onto the cam 85.

This condition exists throughout the second period of operation and at the beginning of the third, the pump outlet valve 66 is closed as its stem leaves the cam 83, and thus the flow of rinsing water into the can ceases. At the same time the steam valve 67 opens permitting live steam to be blown into the interior of the can to scald the same, the steam exhausting through the opening 88 which remains open until the beginning of the next cycle.

If desired, the flow meter 27 may be dispensed with and a scale device illustrated in Figure 7 provided in its stead. This structure consists of a frame 92 suspended from the platform 26, in which the container 28 is slidably mounted being supported by a yoke 93 which is supported from one end of a medially pivoted lever 94, the other end of which is connected with a spring scale device 95 to thus weigh the milk poured into the receptacle 28. A flexible hose 96 connects the container 28 with the pump 24.

From the foregoing description, taken in connection with the accompanying drawings, it will be readily apparent to those skilled in the art to which an invention of the character described appertains, that I provide a novel milk collecting and conveying apparatus which greatly facilitates the transportation of milk from the farms to the dairies and which embodies means for automatically and thoroughly cleansing the milk cans.

What I claim as my invention is:

1. A readily portable can washing machine comprising, a wheeled frame, a rotatable platform mounted on said frame, means for supporting a can concentrically from said platform, a liquid delivery means mounted on said frame concentrically of said platform, a pump mounted beneath said platform, a pipe on the discharge side of said pump connected with said delivery means, means to alternatively connect the pump with a source of cleaning fluid and a source of rinsing fluid whereby a cleaning fluid and a rinsing fluid is successively ejected from said delivery means, and means to pass a sterile fluid through said delivery means.

2. In a can washing device of the character described, a frame, a revolvable platform mounted on said frame, means to mount a can on said platform concentrically thereof, fluid delivery means projecting through said platform concentrically thereof, means to alternatively eject cleaning fluid, a rinsing fluid and a sterilizing fluid through said delivery means, and means to return said cleaning fluid to a source of supply thereof, said ejecting means including a pump adapted to deliver either cleaning fluid or rinsing fluid to said delivery means.

3. In a can washing device of the character described, a frame, a revolvable platform mounted on said frame having a first named means thereon to collect liquid, a tank mounted in said frame beneath said revolvable platform, a second named means in open communication with said platform and with said tank, fluid delivery means mounted on said frame within said second named means, means to alternatively eject cleaning fluid from said tank and rinsing water through said fluid delivery means, means to close said second named means while said rinsing water is being ejected and means to drain the rinsing water from said platform.

4. In a can washing machine of the character described, a frame, a revolvable platform mounted on said frame and having sloping side walls to collect liquid and to support a can thereon, a hollow tube rotatable with said platform and forming a shaft upon which said platform rotates, a bearing in which said tube rotates fixed in said frame, means carried by said tube to drive said platform, a fluid delivery means mounted in said frame concentrically of said platform passing through said tube and means rotatable with said platform controlling the flow of fluid to said fluid delivery means.

5. In a can washing machine of the character described, a frame, a revolvable platform mounted on said frame and having sloping side walls to collect liquid and to support a can thereon, a hollow tube rotatable with said platform and forming a shaft upon which said platform rotates, a bearing in which said tube rotates fixed in said frame, means carried by said shaft to drive said platform, a fluid delivery means mounted in said frame substantially concentrically of said platform passing through said tube and a plurality of cam actuated valves controlling the flow of fluids through said fluid delivery means.

6. In a can washing machine of the character described, a dish-shaped platform having a pair of drain ports therethrough, a tank mounted adjacent and below said platform, a pipe communicating with one of said ports to drain liquid from the interior of said dish-shaped platform into said tank, means to deliver washing fluid under pressure from said tank to the area above said platform, a pair of valves for selectively closing said ports, means to operate the valves to maintain one port open with the other port closed, whereby liquid may be drained either into said tank through the one port or from the platform through said other port.

7. In a can washing machine of the character described, a dish-shaped platform having a pair of ports therethrough, a tank mounted adjacent and below said platform, a pipe communicating with one of said ports to drain liquid from the interior of said dish-shaped platform into said tank, means to deliver washing fluid under pressure from said tank to the area above said platform, a pair of valves closing said ports, a lever having the valves connected thereto at the opposite ends thereof, means pivotally mounting the lever from said platform whereby one valve is open while the other valve is closed, and means to actuate the valves.

8. In a can washing machine of the character described, a dish-shaped platform having a pair of ports therethrough, a cleaning fluid supply tank mounted below said platform, a pipe communicating the interior of said platform with the interior of said tank through one of said ports, a rinsing fluid supply source, means to supply cleaning fluid or rinsing fluid to the area above the dish-shaped platform, a pair of valves closing said ports and adapted to be actuated to close one port and open the other whereby cleaning fluid may drain back into said tank and rinsing fluid drain off the platform through said other port, and means to actuate said valves.

9. In a can washing machine of the character described, a dish-shaped platform having a pair of ports therethrough, a cleaning fluid supply tank mounted below said platform, a pipe communicating the interior of said platform with the interior of said tank through one of said ports, a rinsing water supply source, means to supply cleaning fluid or rinsing fluid to the area above the dish-shaped platform, a pair of valves closing said ports and adapted to be actuated to close one port and open the other whereby cleaning fluid may drain back into said tank through said pipe and rinsing fluid drain off the platform through the other of said ports, a cam, and means connected with the valves to actuate the same upon relative movement between the platform and the cam.

10. In a can washing machine of the character described, a revolvable dish-shaped platform having sloping sides adapted to support and center a can over said platform, means to rotate said platform, means passing through said platform to supply cleaning fluid to the interior of the can and means to drain said cleaning fluid back to its source of supply.

11. A can washing machine of the character described, a dish-shaped platform having sloping sides adapted to support a can centered over said platform, said platform provided with an aperture concentrically located therein, a cleaning fluid tank mounted beneath said platform, a bearing in the top of said tank, a tube rotatably mounted in said bearing and fixed to said platform concentrically to the aperture therein to rotatably mount the platform, means to supply cleaning fluid from said tank to the interior of said can, the cleaning fluid draining back through said tube into said tank.

12. In a can washing machine of the character described, a dish-shaped platform having sloping sides adapted to support a can centered over said platform, said platform provided with an aperture concentrically located therein, a cleaning fluid tank mounted beneath said platform, a bearing in the top of said tank, a tube rotatably mounted in said bearing and fixed to said platform concentrically to said aperture to rotatably mount the platform, a worm wheel mounted on the exterior of said tube and connected to said platform, means including a worm gear to rotate said worm wheel, a pipe passing through said tube substantially concentrically thereof, and means to force cleaning fluid from said tank through said pipe to wash said can, said tube permitting return of the cleaning fluid to said tank.

13. In a can washing machine of the character described, a dish-shaped platform having sloping sides adapted to support and center a can over said platform, a cleaning fluid tank mounted beneath said platform, a tube communicating the top of said dish-shaped platform with the interior of said tank and rotatably mounting the platform, and means to force cleaning fluid from the tank into said can, used washing fluid flowing back into said tank by gravity through said tube.

WALTER J. WACHOWITZ.